United States Patent [19]

Reckziegel et al.

[11] Patent Number: 4,692,370

[45] Date of Patent: Sep. 8, 1987

[54] PROCESS FOR NONSLIP FINISHING OF SMOOTH SURFACES OF OBJECTS AND OBJECTS PRODUCED THEREBY

[75] Inventors: Erich Reckziegel; Heinz Holzapfel, both of Duesseldorf, Fed. Rep. of Germany

[73] Assignee: Henkel Kommanditgesellschaft auf Aktien, Duesseldorf, Fed. Rep. of Germany

[21] Appl. No.: 766,853

[22] Filed: Aug. 16, 1985

[30] Foreign Application Priority Data

Aug. 23, 1984 [DE] Fed. Rep. of Germany ....... 3431002
Oct. 5, 1984 [DE] Fed. Rep. of Germany ....... 3436620

[51] Int. Cl.[4] ........................ B32B 27/12; B05D 1/02; B05D 5/02

[52] U.S. Cl. .................................... 428/198; 414/904; 427/286; 427/401

[58] Field of Search ...................... 156/306.3; 414/904; 427/262, 286, 155, 154, 401; 428/198

[56] References Cited

U.S. PATENT DOCUMENTS

| | | | |
|---|---|---|---|
| 3,755,044 | 8/1973 | Sebel | 156/289 |
| 4,156,398 | 5/1979 | McDaniel | 427/286 X |
| 4,474,842 | 10/1984 | Ankerman | 427/262 X |

FOREIGN PATENT DOCUMENTS

| | | | |
|---|---|---|---|
| 1917566 | 12/1970 | Fed. Rep. of Germany | 427/286 |
| 1072309 | 12/1965 | United Kingdom . | |
| 1025463 | 4/1966 | United Kingdom | 427/286 |

OTHER PUBLICATIONS

*Webster's Ninth New Collegiate Dictionary,* Springfield, MA, Merriam-Webster Inc., 1986, p. 1334.

*Primary Examiner*—Evan K. Lawrence
*Attorney, Agent, or Firm*—Ernest G. Szoke; Henry E. Millson, Jr.; Real J. Grandmaison

[57] ABSTRACT

The invention relates to a process, and the products thereof, for the nonslip finishing of surfaces of objects more especially packaging materials, by applying a hotmelt plastic. The hotmelt may be applied in the form of a microfine random-strand nonwoven, in which the filaments are essentially from 300 to 10 μm and more especially from 150 to 30 μm in diameter and are welded firmly together where they cross one another, or in the form of a foam, in which case the foamed hotmelt is applied to the surfaces by means of suitable applicators in the form of thin 1-5 mm strands separated by intervals of from 10 to 100 mm.

11 Claims, 2 Drawing Figures

PROCESS FOR NONSLIP FINISHING OF SMOOTH SURFACES OF OBJECTS AND OBJECTS PRODUCED THEREBY

BACKGROUND OF THE INVENTION

This invention relates to a process for the nonslip finishing of surfaces, more especially packaging materials both of smooth plastics, such as films, and of other packaging materials based on paper and/or cardboard.

The nonslip finishing of various surfaces has long presented problems because the preparations in question are required to show partly conflicting properties. Thus, a preparation for the nonslip finishing of various surfaces of packaging material should not ultimately promote sticking, particularly in the form of packs because when the individual packs are separated from one another the surface, which may be printed for example, is marred. On the other hand, however, satisfactory anchorage against various movements, such as shaking and jolting, must also be guaranteed.

Interest was initially focussed on packaging materials based on cellulose, such as paper and cardboard. In their case, the preparations used for nonslip finishing were, for example, aqueous dispersions of paraffins and/or polyalkylenes which had to contain a certain amount of paraffin or polyethylene, based on the dispersion, and also incorporated certain quantities of modified natural resins and/or natural resins and also synthetic rubber. However, preparations such as these, which are known from U.S. Pat. No. 3,755,044, were used primarily for the nonslip finishing of paper or cardboard packs.

Aqueous coating compositions have also been successfully used with cellulose hydrate foil. Thus, it is known from British Pat. No. 1,072,309 that aqueous polyvinylidene chloride dispersions containing up to 3% by weight, based on the polymer, of wax and/or paraffin may be used for coating. In addition, the presence of certain nonionic emulsifiers was unavoidable.

In general, these known preparations were incapable of immobilizing packages from plastic films, for example of polyethylene, polypropylene, polyesters, atactic copolymers of ethylene with butylene and also polyamide films, during transport. In practice, this problem was solved by pretreating a thin film in such a way that it was given a rough surface by a mechanical treatment or by applying a plastic. These partially surface-treated films are known commercially as "friction film", but are expensive and thus uneconomical for many packaging applications on account of the very elaborate pretreatment involved.

OBJECTS OF THE INVENTION

An object of the present invention is to produce a nonslip surface layer on smooth surfaces of plastic objects, more especially on packaging films, and on other sensitive surfaces before or after packaging of the material.

Another object of the present invention is the development of a process for the nonslip finishing of smooth surfaces consisting essentially of applying to said smooth surface a coating of a fine-filament or foamed hotmelt plastic in the form of (1) a microfine random-strand nonwoven, the diameter of the filaments of said nonwoven being essentially between 300 and 10 um, the random-strand nonwoven filaments being welded firmly to one another where they cross, said nonwoven being applied in 1 to 4 layers, or (2) a hotmelt plastic foam in the form of strands of from 1 to 5 mm in diameter separated by intervals of from 10 to 100 mm, said coating being applied to said smooth surface at temperatures whereby some adhesion of said coating to said smooth surface occurs but where said smooth surface is not appreciably melted.

A further object of the present invention is the improvement in the method for preventing the sliding or movement of packaged articles having coverings of smooth plastic sheets during transport or storage which comprises applying a nonslip layer to the surface of said coverings of smooth plastic and placing the packaged articles in contact, the improvement which comprises applying to said smooth plastic surface a coating of a fine-filament or foamed hotmelt plastic in the form of (1) a microfine random-strand nonwoven, the diameter of the filaments of said nonwoven being essentially between 300 and 10 $\mu$m, the random-strand nonwoven filaments being welded firmly to one another where they cross, said nonwoven being applied in 1 to 4 layers, or (2) a hot melt plastic foam in the form of strands of from 1 to 5 mm in diameter separated by intervals of from 10 to 100 mm, said coating being applied to said smooth plastic surface at temperatures whereby some adhesion of said coating to said smooth plastic surface occurs but where said smooth plastic surface is not appreciably melted, as said nonslip layer.

These and other objects of the invention will become more apparent as the description thereof proceeds

DESCRIPTION OF THE INVENTION

Figure 1:
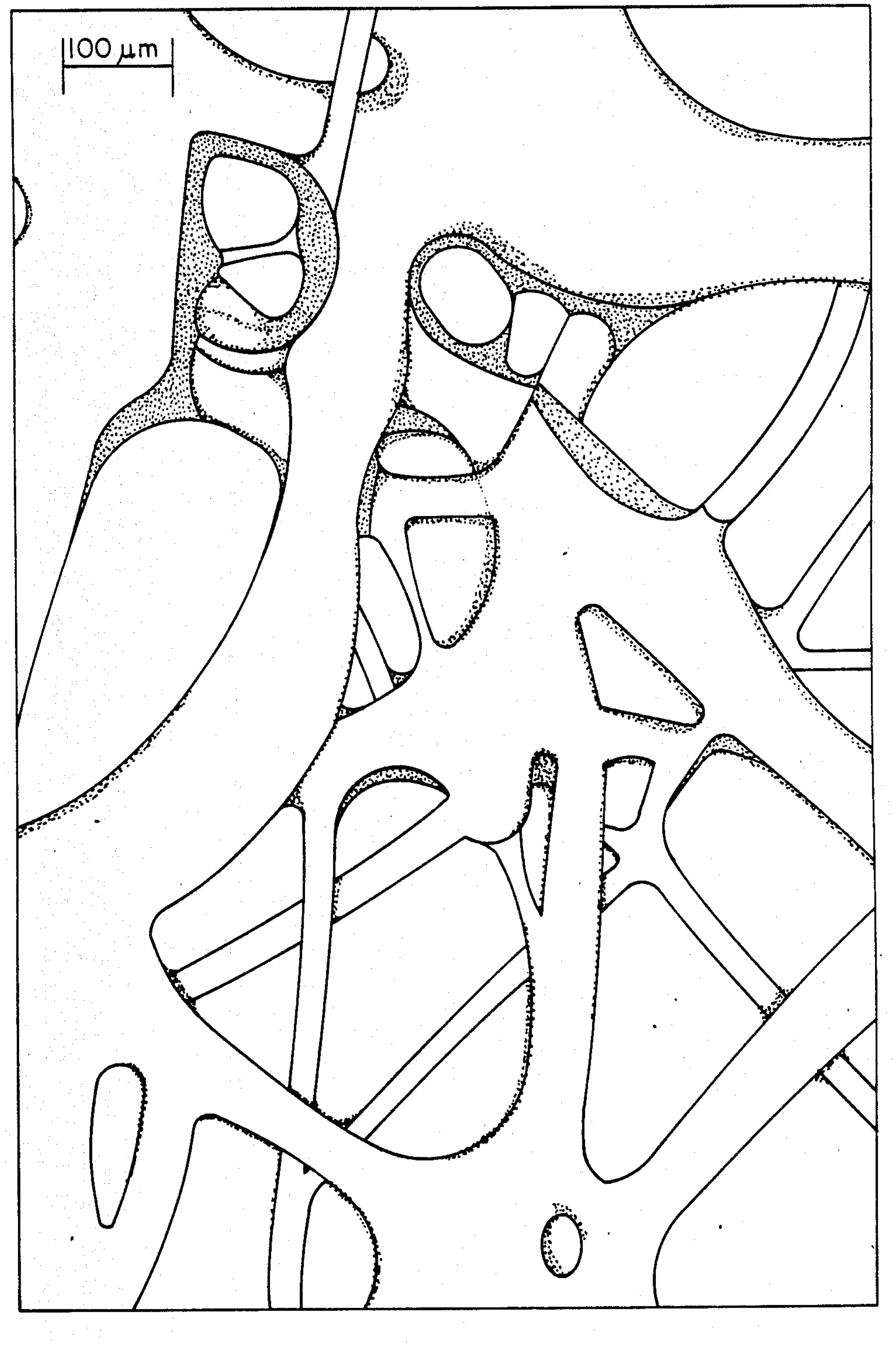
FIG. 1 is a photomicrograph of the nonslip surface produced by Example 1.

Now, the process according to the invention for the nonslip finishing of surfaces, in which the disadvantages mentioned above are avoided, is characterized in that a fine-filament or foamed coating is applied to the surface by means of hotmelts and, after hardening out of contact with other surfaces of packaging material, guarantees a permanent nonslip finish. The surface layer in question may be applied to the film before packaging or to packs optionally cooled to $-40°$ C.

More particularly therefore, the present invention relates to a process for the nonslip finishing of smooth surfaces consisting essentially of applying to said smooth surface a coating of a fine-filament or foamed hotmelt plastic in the form of (1) a microfine random-strand nonwoven, the diameter of the filaments of said nonwoven being essentially between 300 and 10 $\mu$m, the random-strand nonwoven filaments being welded firmly to one another where they cross, said nonwoven being applied in 1 to 4 layers, or (2) a hotmelt plastic foam in the form of strands of from 1 to 5 mm in diameter separated by intervals of from 10 to 100 mm, said coating being applied to said smooth surface at temperatures whereby some adhesion of said coating to said smooth surface occurs but where said smooth surface is not appreciably melted.

According to the invention, it is possible on the one hand, using hotmelts, to produce a fine-filament coating of strands of these materials in the form of a microfine random-strand nonwoven, the diameter of the filaments being essentially between 300 and 10 μm and more especially between 150 and 30 μm, the hotmelt filaments being welded firmly together where they cross one another and the nonwoven being applied in 1 to 4 layers and more especially in 1 or 2 layers. On the other hand, the hotmelt may be applied to the surface to be finished with equal effect in the form of thin foamed strands 1 to 5 mm and more especially 1 to 3 mm in diameter separated by intervals of from 10 to 100 mm and more especially from 20 to 60 mm.

The random-strand nonwoven of hotmelts is produced from standard commercial hotmelts which are sprayed above their melting point at temperatures of from about 150° to 210° C. and more especially at temperatures of from 160° to 190° C. No auxiliaries are required for spraying the hotmelt. In many cases, however, it is favorable to use air or nitrogen heated to 120° C. as a carrier. The external conditions are of course adjusted in such a way that the surface to which the hotmelt is applied in the form of fine filaments does not melt. It is only in the micro range that it may be appropriate for the surface to be coated to melt slightly to ensure firm anchorage between the filaments of the hotmelt and the film to be given the nonslip finish.

The hotmelt may be applied in filament form by spraying directly onto the film to be used for packaging. It is thus possible reproducibly to pretreat packaging films and to obtain an optimal coating. It is also possible to apply the nonslip coating to already packaged items at certain places only either on one side of the pack or on various sides and also in strip-form, spot-form or in any other pattern.

The random-strand nonwoven or the hotmelt web is applied by means of standard industrial applicators fitted with nozzles of various shapes. The use of so-called twist nozzles is a preferred embodiment because it enables the coating to be applied with relatively clear definition along edges. Twist nozzles were used for the following Examples.

In a variant of the process according to the invention for the nonslip finishing of surfaces using hotmelts, in which the above-mentioned disadvantages are also avoided, foamed hotmelts are applied to the surface to be finished by means of suitable applicators in the form of thin strands from 1 to 5 mm in diameter and more especially from 1 to 3 mm in diameter separated by intervals of from 10 to 100 mm and more especially from 20 to 60 mm. The foamed hotmelt is produced from standard commercially available hotmelts of the type described below.

It has proved to be of advantage to foam the hotmelt under a pressure of from 2 to 8 bar from nozzles between 0.15 and 0.6 mm in diameter at nozzle exit temperatures of from about 150° to 190° C. Applicators known per se, in which a gas substantially inert to the hot adhesive is used as the foaming gas or carrier gas, are used for foaming. The inert gas in question may be air, nitrogen-enriched air, nitrogen, carbon dioxide, argon or mixtures thereof.

The hotmelts themselves consist of standard thermoplastic polymers which have a corresponding softening point or which are adjusted with plasticizing resins to a practicable softening point. The application temperature of the hotmelt is best between about 150° and 210° C. and more especially between 150° and 190° C. Suitable thermoplastic polymers are polyolefins and copolymers of olefins, such as polyethylene, polypropylene itself, and also copolymers of ethylene with vinyl acetate, optionally using vinyl propionate, and copolymers of ethylene with methyl methacrylate or polymers of propylene with butene and copolymers of propylene, ethylene and butene, optionally incorporating dicyclopentadiene. Finally, suitable ethylenic polymers include those formed from dicyclopentadiene and vinyl acetate, optionally using maleic acid monoethyl ester.

Another large group are the linear polyesters which may also have a segmented structure and which are also commercially obtainable. They may also be produced on the basis of adipic acid, optionally using terephthalic acid and azelaic acid as the acid component, while the alcohol component consists of ethylene glycol, diethylene glycol, triethylene glycol or even of low molecular weight polyethylene glycols having a molecular weight of from 300 to 800.

Good results are also obtained with polyamides produced on the basis of dimerized fatty acids, optionally using dicarboxylic acids, such as sebacic acid or adipic acid, and short-chain amines, such as ethylene amine, propylene amine, optionally in conjunction with polyether diamines having molecular weights of from about 400 to 2000.

Finally, the hotmelts may contain synthetic hydrocarbon resins or even polyterpene or polyindene resins. Since the hotmelts often have to be heated for prolonged periods to relatively high temperatures, the addition of heat stabilizers is recommended. Suitable stabilizers are phenolic types, such as substituted monophenols, or even organic disulfides such as, for example, laurylstearyl thiodipropionic acid ester. It may be useful to incorporate coloring substances to make the hotmelt coating more clearly visible.

So far as the process of application is concerned, it has proved to be favorable to work under the following conditions:

In the case of coatings of random-strand nonwovens, the hotmelt is applied from 0.5 to 2.5 mm diameter nozzles at temperatures of from 150° to 210° C. under an excess pressure of from 0.5 to 8 bar.

In the case of coatings of the foamed hotmelt, the foam is applied from 0.15 to 0.6 mm diameter nozzles under a pressure of from 2 to 8 bar at nozzle exit temperatures of from about 150° to 190° C.

In the case of random-strand nonwovens, a hotmelt at 150°-190° C. may be applied with heated air or nitrogen at 60° to 120° C. to packs having a plastics surface, which have been deep-frozen to −40° C., on one or both sides of the contacting surfaces of the packs to be stacked.

The foamed hotmelt may be directly applied to the film to be used for packaging purposes. It is thus possible to pretreat packaging films in a particularly reproducible manner and to obtain an optimal coating. In addition, the nonslip coating may be applied to already packed items at certain places only either on one side of the pack or on non-contacting sides not only in strip form, but also in spot form or in any other pattern.

If the hotmelt is highly saturated with air or an inert gas, it may even be applied to very thin thermoplastic films without melting them. With thicker films, the problem of melting does not arise.

By virtue of the air or the carrier gas incorporated, not only is the effect of heat on the surface greatly reduced, adhesion can also be varied through the degree of saturation of the gas in the melt and the thickness of the coating. It is thus possible to produce either a pure nonslip coating or a mildly adhesive coating which enables the packs to be readily separated during depalletizing and which retains its nonslip effect even in the event of repeated palletizing.

Accordingly, the present invention also relates to nonslip surfaces on plastics surfaces of packs, consisting of an arbitrarily arranged system of thin strands of foamed hotmelts of the type obtainable from hotmelt foams by the process described above.

By varying the degree of saturation with different foaming gases and also the diameter and temperature of the strands, the compressibility of the applied foam may be adjusted as required and, hence, an optimal contact surface obtained in relation to the weight of the pack contents.

Preferably the nonslip coatings are applied to smooth plastic surfaces such as films or foils which are used as packaging materials. The invention therefore also comprises an improvement in the method for preventing the sliding or movement of packaged articles having coverings of smooth plastic sheets during transport or storage which comprises applying a nonslip layer to the surface of said coverings of smooth plastic and placing the packaged articles in contact, the improvement which comprises applying to said smooth plastic surface a coating of a fine-filament or foamed hotmelt plastic in the form of (1) a microfine randomstrand nonwoven, the diameter of the filaments of said nonwoven being essentially between 300 and 10 μm, the random-strand nonwoven filaments being welded firmly to one another where they cross, said nonwoven being applied in 1 to 4 layers, or (2) a hotmelt plastic foam in the form of strands of from 1 to 5 mm in diameter separated by intervals of from 10 to 100 mm, said coating being applied to said smooth plastic surface at temperatures whereby some adhesion of said coating to said smooth plastic surface occurs but where said smooth plastic surface is not appreciably melted, as said nonslip layer.

The following examples are illustrative of the process of the invention without being limitative in any respect.

EXAMPLES

The following adhesive mixtures A, B and C were used for finishing surfaces:

(A) A hotmelt of atactic copolymer of propylene and butylene in a molar ratio of about 1:1 with small amounts of ethylene (between 0.1 and 0.05 mol): softening range, 74° to 80° C.; viscosity at 180° C., 7000 to 9000 mPa.s.

(B) A hotmelt of a mixture of 82.5% by weight of ethylenevinyl acetate copolymer (28 mol % vinyl acetate), 11.0% of a commercial hydrocarbon resin (softening point 85° C.), 6.0% by weight of microwax and 0.5% by weight of butylhydroxytoluene: viscosity 19,000 mPa.s. at 180° C.

(C) A hotmelt of 60% by weight of atactic polypropylene, 20% by weight of a commercial polyterpene resin (softening point 105° C.), 19.1% by weight of commercial tall resin (softening point 75° C.), 1.0% by weight of butylhydroxytoluene.

EXAMPLE 1

Using an industrial hotmelt gun (Heinrich Buhnen KG) and hotmelt A, strands were applied in a random arrangement to a 60 μm thick polyethylene film using preheated air (nozzle diameter 0.8 mm, nozzle exit temperature 180°–190° C., pressure 4 bar). The coating thickness amounted to about 1–2 layers on the film. The coating obtained had the appearance, without magnification, of a microfine random-strand nonwoven. Under a microscope (10×12.5 magnification), an image was obtained in which it was possible to see distinctly larger and smaller strands welded to one another at various places and, to a lesser extent, lying loosely on one another. A. characteristic detail is shown in FIG. 1, magnified 200 times.

Five cartons each filled with 500 g of deep-frozen spinach (−36° C.) were packed in-the film thus coated and stacked bottom-down on a pallet to a height of 12 packs.

This pallet was transported 250 km in a refrigerated truck and then unstacked and stored in a cold storeroom. The packs had hardly shifted in transit. Unstacking proceeded without any difficulties. The packs could also be easily lifted off one another.

EXAMPLE 2

Gray cartons (600 g/m$^2$) holding ice-cream portion packs (20 oacks per carton) measuring 15×30×25 cm were sprayed with 15 g/m$^2$ of hotmelt B) using the applicator described above. A microfine random-strand nonwoven similar to FIG. 1 was formed. After the cartons had been filled with the portion packs, they were stacked by hand in a cold storeroom. Anchorage was excellent.

Pallets loaded with these packs were also transported 250 km in a refrigerated truck and then unloaded in a cold storeroom. The packs did not shift either in transit or during unloading at the cold storeroom.

EXAMPLE 3

Mixture C) was kept at 170° C. in the premelting container of an industrial hotmelt applicator and applied with heated air through a 0.5 mm diameter nozzle to packs wrapped in shrink film under an excess pressure of 0.8 bar. The packs each consisted of 5 cartons filled with pizzas and were deep-frozen to −36° C. They were then guided past the applicators in such a way that a strip-form coating resembling a random-strand nonwoven in appearance was obtained on the top and bottom (coating approx. 0.5 g per pack, area approx. 800 cm$^2$). This pack was also subjected to the refrigerated truck transport test which it passed satisfactorily.

Figure 2:
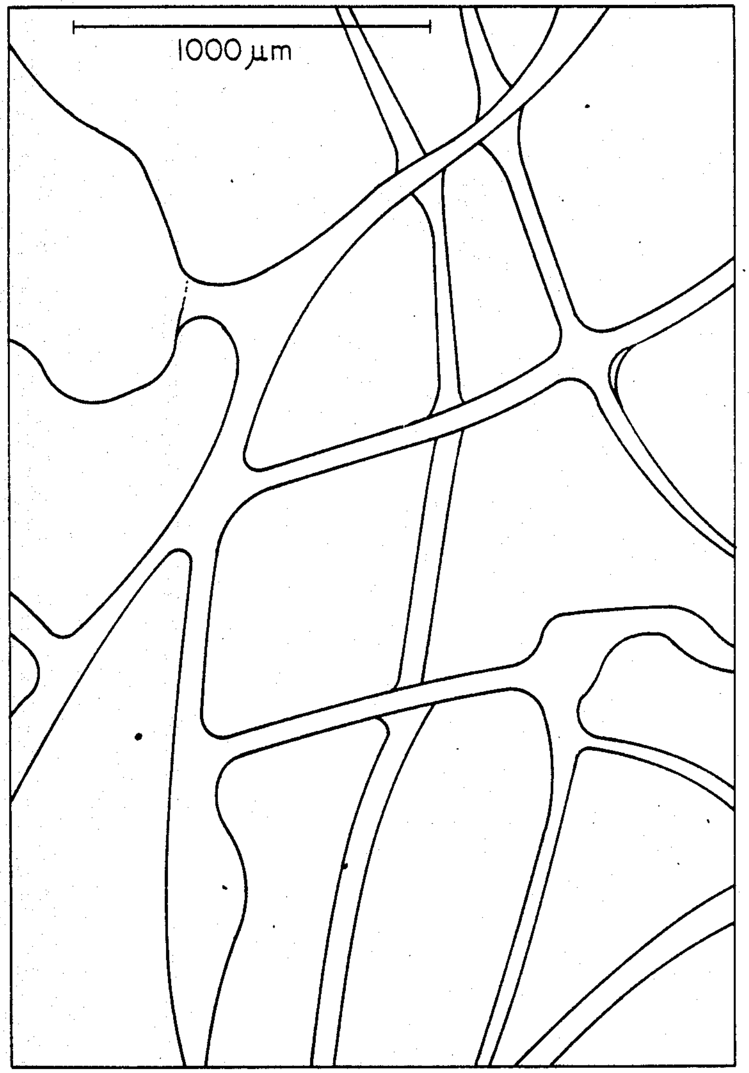
FIG. 2 is a photomicrograph of the nonslip surface produced by Example 3.

FIG. 2 is a detail of the hotmelt coating on the shrink film magnified 60 times.

EXAMPLE 4

Two longitudinal strands 2 mm wide and 100 mm long of the foamed hotmelt B) were applied through a 0.25 mm diameter nozzle to a 600 mm×400 mm carton covered with a smooth plastic film at the four corners parallel to the two longitudinal edges at distances of 50 and 100 mm therefrom, the quantity of coating applied amounting to approx. 12 g/m$^2$. The coating was applied under the following conditions: nozzle exit temperature 180° C., pressure 3 bar, degree of saturation with air 20%.

A permanent nonslip coating was thus obtained, withstanding frequent loading and unloading without any weakening of the effect.

EXAMPLE 5

200×300×18 mm packs shrunk with 80 μm PE-film each containing five mail-order house catalogs were coated with two 1 mm wide and 200 mm long strips of hotmelt C) saturated to 25% with nitrogen. The application temperature was 160° C., the pressure 2 bar and the consumption of adhesive per pack 0.05 g.

A permanent nonslip effect was obtained in this way.

The preceding specific embodiments are illustrative of the practice of the invention. It is to be understood however, that other expedients known to those skilled in the art or disclosed herein may be employed without departing from the spirit of the invention or the scope of the appended claims.

We claim:

1. A process for the nonslip finishing of smooth surfaces of plastic objects consisting essentially of applying to said smooth surfaces a coating of a fine-filament hotmelt thermoplastic polymer in the form of a microfine random-strand nonwoven, the diameter of the filaments of said nonwoven being essentially beteen 300 and 10 μm, the random-strand nonwoven filaments being welded firmly to one another where they cross, said nonwoven being applied in 1 to 4 layers, said coating being applied to said smooth surfaces from 0.5 to 2.5 mm diameter nozzles at temperatures of from 150° to 210° C. and under an excess pressure of from 0.5 to 8 bar, whereby some adhesion of said coating to said smooth surfaces occurs but whereby said smooth surfaces are not appreciably melted.

2. The process of claim 1 wherein the diameter of said filaments is from 150 to 30 μm and said nonwoven is applied in 1 to 2 layers.

3. Plastic objects having the nonslip surfaces produced by the process of claim 1.

4. The process of claim 1 wherein said coating of hotmelt thermoplastic polymer is applied to packs having smooth plastic surfaces and which have been deep-frozen to −40° C., and said hot melt thermoplastic polymer is applied to at least one side of the surfaces of said packs that will be in contact when said packs are stacked.

5. The method for preventing the sliding or movement of packaged articles having coverings of smooth plastic sheets during transport or storage which comprises applying a nonslip layer to the surface of said coverings of smooth plastic sheets and placing the packaged articles in contact, the improvement which comprises applying to said smooth plastic sheets, as said nonsliplayer, a coating of a fine-filament hotmelt thermoplastic polymer in the form of a microfine random-strand nonwoven, the diameter of the filaments of said nonwoven being essentially between 300 and 10 μm, the random-strand nonwoven filaments being welded firmly to one another where they cross, said nonwoven being applied in 1 to 4 layers, said coating being applied to said smooth plastic sheets from 0.5 to 2.5 mm diameter nozzles at temperatures of from 150° to 210° C. and under an excess pressure of from 0.5 to 8 bar, whereby some adhesion of said coating to said smooth plastic sheets occurs but whereby said smooth plastic sheets are not appreciably melted.

6. The method of claim 5 wherein said filament diameter is from 150 to 30 μm and said nonwoven is applied in 1 to 2 layers.

7. A process for the nonslip finishing of smooth surfaces of objects consisting essentially of applying to said smooth surfaces a coating of a foamed hotmelt plastic in the form of strands of from 1 to 5 mm in diameter separated by intervals of from 10 to 100 mm, said coating being applied to said smooth surfaces from 0.15 to 0.6 mm diameter nozzles at nozzle exit temperatures of from about 150° to 190° C. and under a pressure of from 2 to 8 bar, whereby some adhesion of said coating to said smooth surfaces occurs but whereby said smooth surfaces are not apprreciably melted.

8. The process of claim 7 wherein said strands are from 1 to 3 mm in diameter separated by intervals of from 20 to 60 mm.

9. The process of claim 7 wherein said foamed hotmelt plastic is applied by means of heated air or nitrogen at 60° to 120° C. to packs having smooth plastic surfaces and which have been deep-frozen to −40° C., and said hotmelt plastic is applied to at least one side of the surfaces of said packs that will be in contact when said packs are stacked.

10. Objects having nonslip surfaces produced by the process of claim 7.

11. The method for preventing the sliding or movement of packaged articles having coverings of smooth plastic sheets during transport or storage which comprises applying a nonslip layer to the surface of said coverings of smooth plastic and placing the packaged articles in contact, the improvement which comprises applying to said smooth plastic sheets, as said nonslip layer, a coating of a foamed hotmelt plastic in the form of strands of from 1 to 5 mm in diameter separated by intervals of from 10 to 100 mm, said coating being applied to said smooth plastic sheets from 0.15 to 0.6 mm diameter nozzles at nozzle exit temperatures of from about 150° to 190° C. and under a pressure of from 2 to 8 bar, whereby some adhesion of said coating to said smooth plastic sheets occurs but whereby said smooth plastic sheets are not appreciably melted.

* * * * *